Sept. 17, 1963    JEAN-CLAUDE H. ROULINA    3,104,141
DEVICE FOR DISTRIBUTING TRAYS OF FOOD
Filed June 29, 1961

INVENTOR
JEAN-CLAUDE H. ROULINA
By Young & Thompson
ATTY.

United States Patent Office 3,104,141
Patented Sept. 17, 1963

3,104,141
DEVICE FOR DISTRIBUTING TRAYS OF FOOD
Jean-Claude Henri Roulina, Villeneuve-Saint-Georges, France, assignor to Compagnie Nationale Air France, Paris, France, a French company
Filed June 29, 1961, Ser. No. 120,684
Claims priority, application France June 30, 1960
3 Claims. (Cl. 312—306)

This invention relates to a device for distributing trays of food.

In many public institutions, such as canteens, hospitals, aircraft, railway trains, etc., meals are frequently prepared beforehand on trays which are distributed one by one to the diners. On completion of the meal, these trays are removed with the used dishes, cutlery, etc.

For the staff involved, the distribution of such trays involves numerous movements back and forth; besides, distribution of this kind is slow and, in cases where hot food is served, this food is often cold when it reaches the last diner.

In certain cases, especially on board aircraft where the numbers of passengers are constantly increasing whilst the duration of flight is constantly decreasing, the intervals necessary for the distribution and clearing of the trays may become so curtailed that a meals service will be practically impossible to carry out by the personnel of the aircraft, the physical effort involved being moreover very strenuous.

Thus, the present invention relates to a device for distributing trays of food, which device simplifies considerably the distribution and clearing away of the trays.

The device, according to the invention, comprises an upright casing open, at the top, means at the base of the casing for moving said casing, a platform vertically displaceable in the casing and intended to support at least one column of a stack of trays to be distributed, and means for raising or lowering said platform as desired to provide access through the opening at the top of the casing to the upper surface of the stack.

The means whereby the movable platform may be raised and lowered may be controlled manually or by a source of energy, such as a pneumatic device or a battery of electric accumulators driving a motor which produces the movement of the platform by way of a vertical threaded rod co-operating with an endless screw driven by said motor.

According to a further embodiment of the invention the weight of the trays placed upon the movable platform is substantially compensated for by a resilient force, the value of which is at maximum when the platform is in the bottom position and which diminishes progressively as said platform rises. Thus, whatever the level of the movable platform, a substantially constant force enables the platform to be displaced in one or other direction.

Such a resilient force may be advantageously provided by rubber extensible bands or springs, one extremity of which exerts an upward pull on the movable platform, the other extremity passing through a series of guide pulleys and being secured to a part of the casing of the device. In this case, the securing part for the rubber band or rubber bands on the casing is preferably adjustable, whereby the tension on said rubber bands may be varied in accordance with the state of loading of the trays.

Thus, the rubber bands are under greater tension when the trays are carrying their full load and may be relieved of tension when, after the meal is over, the trays carrying only the empty plates, etc., are returned to the casing for clearing away.

Figure 1:
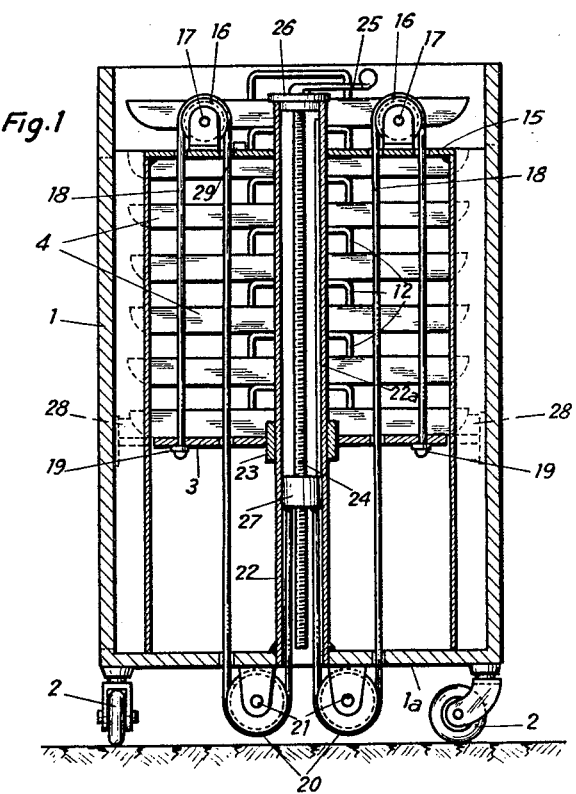
FIG. 1 is a vertical section through a distributing device according to the invention, on the line I—I of FIG. 2.

Referring now to FIG. 1 of the drawings, the device comprises a casing 1 of elongated parallelepiped form which is open at its upper part and mounted on castor wheels 2. Within this casing is located a movable platform 3 on which trays 4 are stacked. In this embodiment, two columns of trays are stacked one on each side of the central portion of the casing.

On these trays, the various elements of a meal (see FIG. 2) are suitably placed, i.e., plate 5, glass 6, cutlery 7, various foods 8, 9, 10, 11 in appropriate containers. The trays may be stacked since the handles 12 thereof project considerably above the edges of the trays and thus serve as supports for the base of the superposed tray. In order to ensure the stability of the stack of trays, recesses to receive the upper edges of the handles may be provided in the base of each tray. One of the dishes, for example 11, may be hot food contained in a closed vessel which may be placed in position at the last moment on each tray by sliding the vessel laterally through an opening provided with a door 13 in each of the lateral walls of the casing. The casing contains at its upper lateral edge cut-away portions 14, so that each tray may be more easily grasped with one hand when it arrives at the upper part of the casing or so that each tray may be returned with one hand to its position in the stack during clearing away.

As illustrated in the drawing, the identical trays situated on each side of the central portion of the casing are disposed top-to-tail the doors 13 and the cut-away portions 14 being diagonally opposed relative to the centre of the casing.

The central portion of the casing is provided with a cross member 15 which supports two pulleys 16 rotatable on shafts 17 and arranged symmetrically about the centre of the casing. Over said pulleys pass two extensible rubber bands or springs 18 which pass through the cross member 15 and the platform 3 and are secured to the underside of the platform 3 by locking members 19.

At the lower part of the casing, the rubber bands 18 are carried under pulleys 20 rotatable on shafts 21 mounted in brackets integral with the base 1a of the casing 1 and are then carried upwards into a central tube 22 passing through the platform 3. A guide sleeve 23 located at the centre of the platform, and possibly provided with roller bearings, facilitates sliding of the platform in contact with the tube 22.

The upper end of the tube 22 is secured to the cross member 15. Through the tube passes a threaded rod 24 at the upper exteremity of which a handle 25 is provided which is integral with a plate 26 capable of rotating freely upon the associated end of the tube 22, possibly with provision of a ball-bearing race. A nut 27 is threaded on to the thereaded rod 24 and is prevented from rotating by a rib 22a provided on the inner wall of the tube 22 and engaging a slot in the side of said nut. The extremities of the bands 18 are secured to this nut.

By turning the handle 25 in the direction which causes the nut 27 to travel upward along the rod 24, the tension of the rubber bands is increased, whereby it is possible to compensate for increased loading of the movable platform 3; the opposite effect can obviously be obtained by turning the handle in the opposite direction.

In the embodiment illustrated only one pair of rubber bands 18 has been shown. It will be understood that, in order to obtain the desired equilibrium, this number may be increased according to the respective force involved and the load on the movable platform. It is also possible to use rubber bands to which inextensible portions have been added in order to modify the resilient action desired. In order to ensure that the platform rises smoothly without risk of tilting, angle-pieces 28 may be fitted at the corners of the platform to serve as guides for the platform, said angle-pieces engaging the inner corners of the casing 1.

Figure 2:
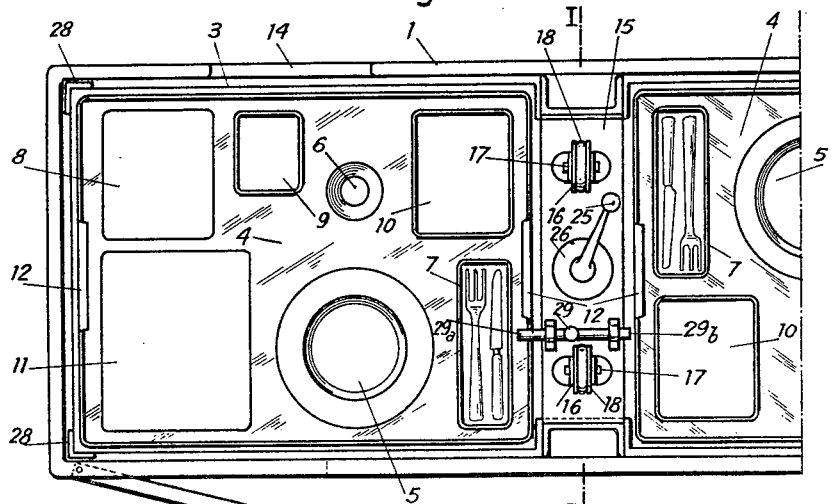
FIG. 2 is a partial plan view of the distributing device.

In the embodiment according to FIGS. 1 and 2, it is assumed that, as the platform rises, the bands 18 exert an upward pull greater than the weight of the loaded platform. Consequently, sliding bolt 29 is mounted on the cross member 15, the extremities 29a and 29b engaging alternately the edges of the right-hand and the left-hand trays, respectively, in order to prevent further upward movement of the platform.

Referring to FIG. 2, by moving this bolt alternately towards the left and towards the right, the platform may be raised to the extent of one tray by releasing the tray with which the bolt was in engagement; as soon as this tray is released, however, the bolt is caused to project on the opposite side so that, as the edge of the tray situated on the other side strikes against the bolt, the platform is now unable to rise higher than the level of one single tray. A braking device, for example of the dash-pot type, may be provided in order to prevent the trays rising too abruptly under the tension of the rubber bands. In order to avoid damaging the edges of the trays, and at the same time, to improve the braking effect, the extremities of the bolts may be fitted with some resilient material, such as felt, rubber, etc.

It will be appreciated that, by virtue of the distributing device according to the invention, meals service carried out from a central corridor to diners situated on each side, as for example in a passenger aeroplane, may be effected many times more rapidly than with the conventional method of distribution whereby the attentant passes continually to-and-fro along the corridor.

It is manifest that certain modifications may be applied to the embodiments which have been described above, in particular by substituting equivalent technical means, such as a pneumatic device, without thereby departing from the framework of the present invention.

I claim:
1. A device distributing trays, comprising an upright casing open at the top, means at the base of the casing for moving the casing, a platform vertically displaceable in the casing and intended to support at least one column of a stack of trays to be distributed, resilient means for exerting an upward force on said platform to tend to raise said platform and comprising a number of resilient bands one end of each of which is attached to said platform to exert an upward pull on the platform, a single element provided in the casing to which the other end of each of said bands is connected, and means for adjusting said element relative to the casing during operation of the device to regulate and vary the tension of the bands and thus the force exerted by the bands on the platform.

2. A device as claimed in claim 1, the element comprising a nut threaded on to but prevented from rotating with a screw located within a tube in the casing, the other end of each of the bands being connected to the nut, and means being provided to rotate the screw to cause the nut to move along the screw to vary the tension of the resilient bands.

3. A device as claimed in claim 2, including locking means for checking upward movement of the platform and comprising a slidable bolt, a mounting for said bolt fixed to said casing, said bolt being engageable with an edge of a tray and providing for release of the trays individually from the platform.

References Cited in the file of this patent
UNITED STATES PATENTS

| | | |
|---|---|---|
| 2,251,874 | Gibbs | Aug. 5, 1941 |
| 2,560,928 | Bockius | July 17, 1951 |
| 2,649,992 | Bockius | Aug. 25, 1953 |
| 2,692,177 | Larsen | Oct. 19, 1954 |
| 2,707,142 | Waite | Apr. 26, 1955 |
| 2,717,085 | Waddington | Sept. 6, 1955 |
| 2,812,104 | Larsen | Nov. 5, 1957 |
| 2,854,308 | Harris | Sept. 30, 1958 |
| 3,028,210 | Byars | Apr. 3, 1962 |